Patented June 18, 1946

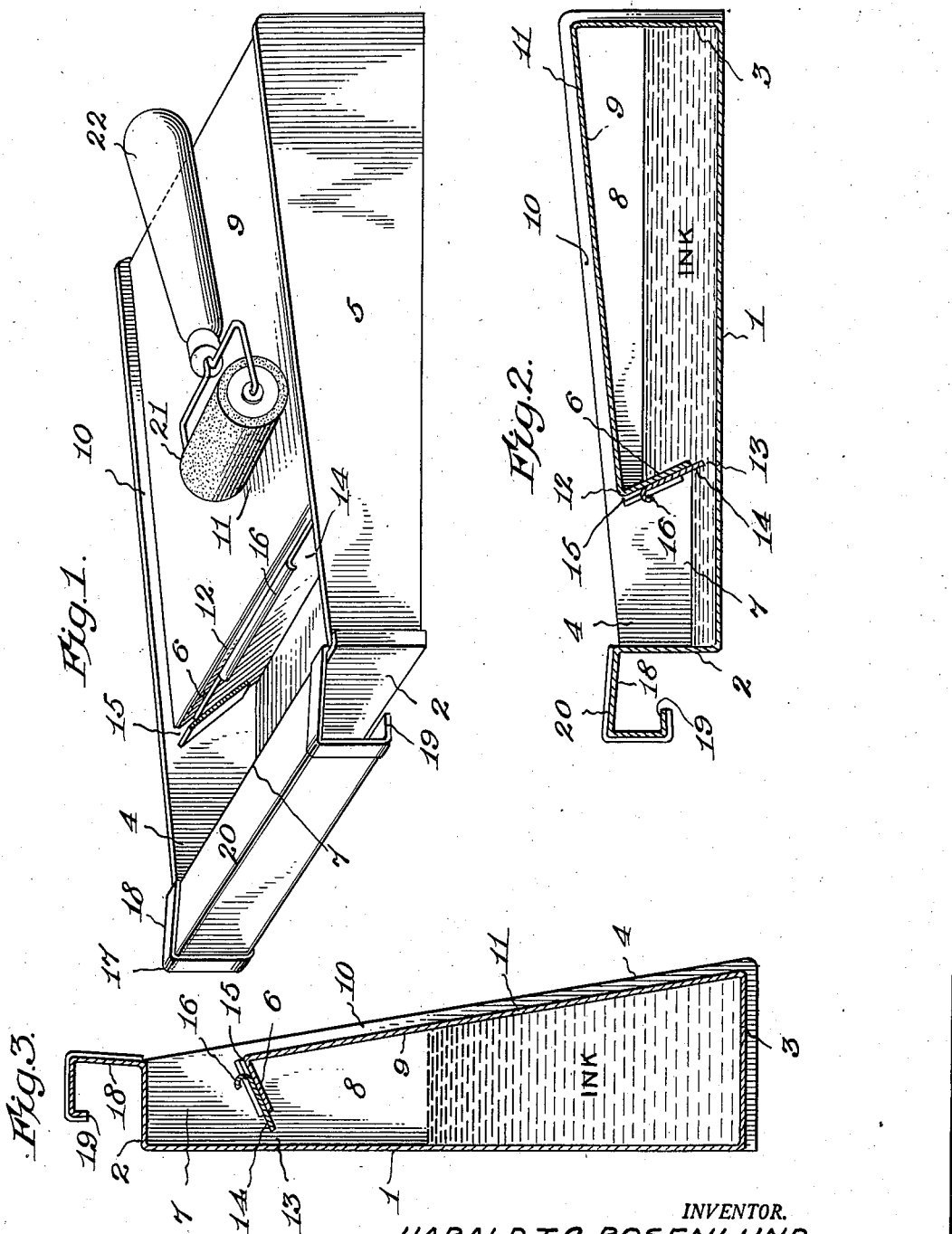

2,402,346

UNITED STATES PATENT OFFICE 2,402,346

STENCIL SET

Harald T. C. Rosenlund, New York, N. Y.

Application December 14, 1943, Serial No. 514,277

2 Claims. (Cl. 15—130.5)

This invention relates to stencil sets and is directed more particularly to the provision of an economical self-regulating ink container for use in connection with such sets.

The object of the invention is to provide a simple construction by which stenciling may be carried out in an efficient manner.

Speaking generally, this invention comprises an elongated container which in use is adapted to rest horizontally upon a flat surface. A portion of the length of the container is closed by a top wall, at least a part of which slopes in the direction of the other part of the container, which is open at its top. The open and covered portions of the container are separated by a partition so as to provide, at one side of the partition, an open top well and, at the other side of the partition, an ink reservoir from which the well is fed through an opening in the base of the partition, to thereby produce a self-regulating feed of ink from the reservoir into the well for the purpose of maintaining a substantially constant ink level in the well. The partition between the well and reservoir preferably is inclined in the direction of the reservoir so that the well is of greater area at the bottom than at its top and the opening through this partition may be closed or opened when desired by a manually operable valve.

The sloping upper surface of the reservoir provides a surface which may serve as an inking surface for properly distributing ink over a roller, forming part of the stencil set.

The well end of the container is provided with an appropriate handle so that it may be carried with this end up and, when lifted into its carrying position, the ink will flow from the well into the reservoir so that, when the valve in the partition is closed, the reservoir will be sealed to protect the ink against thickening due to evaporation and to keep foreign matter from getting into the ink when the device is not in use.

Features of the invention, other than those adverted to, will be apparent from the hereinafter detailed description and claims, when read in conjunction with the accompanying drawing.

The drawing illustrates one practical embodiment of the invention, but the construction therein shown is to be understood as illustrative, only, and not as defining the limits of the invention.

Figure 1 is a perspective view of a self-regulating ink container embodying the present invention showing an ink applying roller in cooperative relation with the inking surface of the device. This figure shows the device in horizontal condition for use.

Figure 2 is a central longitudinal section through the structure of Figure 1 with the ink roller removed.

Figure 3 is a view similar to Figure 2, but showing the device in upright carrying position in which it is placed when not in use.

The container of this invention comprises a bottom 1 having upstanding end walls 2 and 3 and upstanding side walls 4 and 5. Positioned in proximity to the end wall 2 is a partition 6 which extends transversely between the sides 4 and 5 and divides the interior of the container into two chambers 7 and 8, the former of which constitutes the well and the latter of which constitutes a reservoir. The top of the reservoir is closed by a permanent tight cover wall 9 at least a portion of which slopes in the direction of the well to provide an ink distributing surface 11. The whole of the top surface of the wall 9 is shown as sloped in the drawing, but in some models this wall is sloped up from the well for somewhat more than half the distance to the wall 3 and is flat back to said wall. The side walls 4 and 5 preferably extend above the surface 11 as shown at 10, so as to preclude lateral flow of ink from said surface.

The partition 6 preferably is inclined in a direction away from the well 7, so as to impart greater capacity to the well and to provide a wiping edge 12, the purpose of which will be presently explained. At the bottom of the partition 8 is an opening 13 through which ink may pass from the reservoir to the well and vice versa. This opening 13 is normally open when the device is in use, but when not in use may be closed by a gate valve 14 mounted to slide in guides 15 at its opposite ends and having a finger piece 16.

The well end of the container is provided with a handle 17. This handle may be conveniently provided by blanking out the device with an extension on the end wall 2 and bending this extension into the substantially V-shaped form shown. One leg 18 of the U-shaped handle is longer than the other leg 19 and the upper surface 20 of leg 18 is shown as inclined in the direction of the well 7 when the device is in horizontal position so that an ink which might be slopped over the end of the well will flow back thereinto from the surface 20. The lateral edges of the handle are returned upon themselves to form a smooth, thickened reinforced, raised edge.

To charge the container with ink, said container is placed in the upright position shown in Figure 3, the valve 14 is slid open to uncover the opening 13 and ink is poured into the well 7 and immediately flows therefrom into the reservoir 8. The inclined partition 6 assures a draining of all of the ink into the reservoir.

When it is desired to use the device, it is shifted downwardly into the horizontal position shown in Figure 2 and the valve 14 is opened. Ink will thereupon flow from the reservoir 8 into the well 7 and will maintain therein a substantially constant liquid level, so long as there is ink contained in the reservoir above the uppermost portion of the opening 13.

The ink in the well is used by dipping into the well the felt roller 21 of the manually operable stenciling or striping implement 22 shown in Figure 1. After dipping the roller into the ink in the well, it may, if desired, be scraped over the edge 12 to free it of excess ink and it is then rolled back and forth over the upper sloping surface 11 of the reservoir. This serves to thoroughly distribute the ink over and through the felt roller, so that there is a substantially uniform amount of ink on and contiguous to all parts of the surface of the roller. It may be initially necessary to dip the roller in the well more than once and to roll it back and forth several times over the surface 11 in order to obtain this distribution, but after it has been once obtained occasional dipping will maintain this condition, so that the roller will be kept uniformly charged with ink and may be used in the usual manner for striping or in conjunction with any appropriate stencil for the stenciling operation.

In practice the present invention is highly efficient. It insures uniform stenciling impressions and will not result in smudging through the application of too much ink while stenciling, for the ink in the roller may be constantly maintained uniform.

The structure of the self-regulating ink container of this invention is simple, but it is so constituted as to give highly satisfactory practical results in every way. When not in use, it is preferably stood on end as shown in Figure 4 and in this position all of the ink will run into the reservoir where it may be sealed by closing the valve 14.

The foregoing detailed description sets forth the invention in its preferred practical form, but the invention is to be understood as fully commensurate with the appended claims.

Having thus fully described the invention, what I claim as new and desire to secure by Letters Patent is:

1. A self-regulating ink container for a stencil set comprising an elongated normally horizontal receptacle having bottom, side and end walls and a transverse partition intermediate its ends to divide the interior of said receptacle into an ink well and a reservoir, the former of which has an open top and the latter of which has a rigidly fixed imperforate top wall at least a portion of which slopes toward the well to serve as an ink distributing surface having raised lateral edges to confine the operations of a stencil roller to said surface and preclude the flow of ink laterally from said surface and direct its drainage back into the open top of said well, there being an opening in the partition near the bottom thereof through which ink may feed by gravity from the reservoir to the well, said partition being inclined inwardly toward said feed opening and partially underlying the said ink distributing surface to drain the ink from the well to the reservoir when the receptacle is set upright to rest on the rear end wall of the reservoir when not in use.

2. A self-regulating ink container for a stencil set comprising an elongated normally horizontal receptacle having bottom, side and end walls and a transverse partition intermediate its ends to divide the interior of said receptacle into an ink well and a reservoir, the former of which has an open top and the latter of which has a rigidly fixed imperforate top wall at least a portion of which slopes toward the well to serve as an ink distributing surface having raised lateral edges to confine the operations of a stencil roller to said surface and preclude the flow of ink laterally from said surface and direct its drainage back into the open top of said well, there being an opening in the partition near the bottom thereof through which ink may feed by gravity from the reservoir to the well, said partition being inclined inwardly toward said feed opening and partially underlying the said ink distributing surface to drain the ink from the well to the reservoir when the receptacle is set upright to rest on the rear end wall of the reservoir when not in use, and a closure associated with said partition opening to seal the reservoir when the receptacle is in such upright position and after the ink has drained from the well into said reservoir.

HARALD T. C. ROSENLUND.